(12) United States Patent
Schoubye et al.

(10) Patent No.: US 7,776,299 B2
(45) Date of Patent: Aug. 17, 2010

(54) PROCESS FOR REMOVAL OF $SO_2$ FROM OFF-GASES BY REACTION WITH $H_2O_2$

(75) Inventors: Peter Schoubye, Hørsholm (DK); Kurt Agerbæk Christensen, Birkerød (DK); Morten Thellefsen Nielsen, Hillerød (DK)

(73) Assignee: Haldor Topsøe A/S, Lyngby (DK)

( * ) Notice: Subject to any disclaimer, the term of this patent is extended or adjusted under 35 U.S.C. 154(b) by 1124 days.

(21) Appl. No.: 10/539,604

(22) PCT Filed: Dec. 4, 2003

(86) PCT No.: PCT/EP03/13699

§ 371 (c)(1),
(2), (4) Date: Jun. 17, 2005

(87) PCT Pub. No.: WO2004/056449

PCT Pub. Date: Jul. 8, 2004

(65) Prior Publication Data

US 2006/0057047 A1    Mar. 16, 2006

(30) Foreign Application Priority Data

Dec. 21, 2002   (DK) .............................. 2002 01992

(51) Int. Cl.
*B01D 53/52* (2006.01)
*B01D 53/60* (2006.01)

(52) U.S. Cl. .............. 423/242.1; 423/243.01; 95/235

(58) Field of Classification Search ............ 96/361; 95/235; 423/242.1, 243.01
See application file for complete search history.

(56) References Cited

U.S. PATENT DOCUMENTS

| 3,733,393 | A |   | 5/1973 | Couillaud et al. |
| 3,760,061 | A | * | 9/1973 | Hammond ............. 423/243.01 |
| 3,953,578 | A | * | 4/1976 | Thirion ........................ 423/252 |
| 4,441,897 | A | * | 4/1984 | Young et al. ..................... 96/36 |
| 4,678,481 | A | * | 7/1987 | Diep ............................. 95/65 |
| 5,017,350 | A | * | 5/1991 | Hakka et al. ............. 423/242.7 |
| 5,108,731 | A | * | 4/1992 | Schoubye ................... 423/522 |
| 5,595,713 | A |   | 1/1997 | Gohara et al. |
| 5,674,459 | A |   | 10/1997 | Gohara et al. |
| 2004/0062697 | A1 | * | 4/2004 | Mortson et al. ............. 423/235 |

FOREIGN PATENT DOCUMENTS

| CN | 1173386 A |   | 2/1998 |
| DE | 4 36 899 |   | 5/1992 |
| DE | 40 36 899 |   | 5/1992 |
| DE | 44 24 367 |   | 1/1996 |
| EP | 0 107 144 |   | 5/1984 |
| GB | 1 202 065 |   | 8/1970 |
| GB | 1 499 536 |   | 2/1978 |
| GB | 1499536 | * | 2/1978 |
| JP | 53-135878 |   | 11/1978 |
| JP | 60153923 |   | 8/1985 |
| JP | 6-1042440 |   | 5/1994 |

* cited by examiner

*Primary Examiner*—Duane Smith
*Assistant Examiner*—Ives Wu
(74) *Attorney, Agent, or Firm*—Dickstein Shapiro LLP

(57) ABSTRACT

A process for removal of $SO_2$ in off-gases having a temperature of 30-150° C. and containing 0.001-1 vol % $SO_2$ in which the $SO^2$ is oxidised to $H_2SO_4$ by spraying an aqueous solution of $H_2O_2$ into the off-gas upstream of an aerosol filter removing the produced sulphuric acid from the off-gas.

3 Claims, 1 Drawing Sheet

PROCESS FOR REMOVAL OF $SO_2$ FROM OFF-GASES BY REACTION WITH $H_2O_2$

Figure 1:
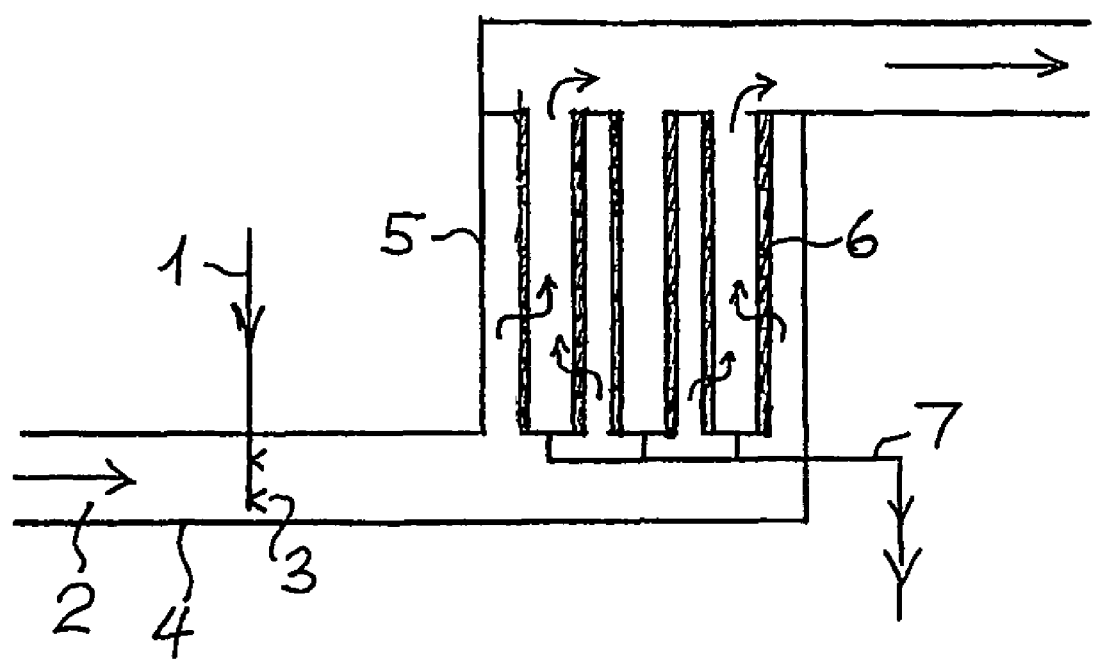

The present invention relates to a process for removal of $SO_2$ from off-gases by reaction with $H_2O_2$.

It has been known for more than 30 years that $SO_2$, as described in the publication 2164e from Lurgi/Südchemie AG, August 1989, can be removed from off-gases by contacting the off-gas in an absorption tower with circulating solution of dilute sulphuric acid containing $H_2O_2$, whereby $SO_2$ is dissolved and oxidised to $H_2SO_4$ in the solution. The circulating solution typically contains 30-60% $H_2SO_4$ and 0.1-0.5% $H_2O_2$. The absorption is typically carried out at a temperature of 50-80° C. of the circulating solution. $H_2O_2$ is added either as a concentrated aqueous solution of $H_2O_2$ to the circulating acid, or it is produced by electrolysis of a side stream of the circulating acid. The produced acid is drawn off from the circulating acid.

The known process usually requires installation of a low velocity aerosol filter downstream of the absorption tower to remove sulphuric acid aerosol (acid mist) in order to meet acid mist emission regulations requiring less than about 5 mol ppm $H_2SO_4$ in the stack gas. Fine acid mist (aerosol) that may be present in the off-gas is not removed efficiently in the absorption tower. Fine acid mist is also formed in the absorption tower itself by reaction between $SO_2$ and $H_2O_2$ vaporised from the absorbing liquid.

It is a disadvantage of the known process that it requires installation of both an absorption tower and a low velocity mist filter.

In the process according to the present invention, $SO_2$ in off-gases is removed by reaction with $H_2O_2$ without the use of an absorption tower by spraying a solution of $H_2O_2$ in water or dilute sulphuric acid into the off-gas upstream of a low velocity aerosol filter or wet electrostatic precipitator (WESP).

A preferred embodiment of the invention is shown in FIG. 1. A solution of 0.1-30% $H_2O_2$ in line 1 is sprayed by the spray nozzles 3 into a stream of off-gas in line 2 containing typically between 100-1000 ppm $SO_2$ and having a temperature typically in the range of 50-120° C. The nozzles are placed in duct 4, so that the spray is evenly distributed in the gas stream upstream of the mist filter 5 in which the gas is passed in parallel through a number of low velocity filter candles 6. Even distribution of the droplets in the gas is desirable for the process and the most even distribution of the droplets is achieved by using air-atomising nozzles producing very small droplets. The $H_2SO_4$ formed in the process accumulates in the filter elements or candles from which it is drained off through line 7. Most or all of the mass of the droplets evaporate before the gas enters the filter candles, whereby most of the $H_2O_2$ evaporates and reacts in the gas phase under formation of sulphuric acid aerosol. However, it is not necessary that the droplets are completely evaporated before the gas enters the filter elements. The reaction between $SO_2$ and $H_2O_2$ will be completed and the thermal equilibrium will be established in the mist filter elements without decreasing the efficiency of the $SO_2$-removal.

Thus, the injection of the aqueous solution $H_2O_2$, serves two purposes:

Firstly, it adds to the off-gas the amount of $H_2O_2$, which is required for achieving the desired conversion of $SO_2$ into $H_2SO_4$ by the reaction $$H_2O_2 + SO_2 = H_2SO_4$$

Most of the conversion takes place by reaction in the gas phase between $SO_2$ and vaporised $H_2O_2$ under formation of acid mist or between $SO_2$ and $H_2O_2$ dissolved in the droplets. The reaction is completed in the aerosol filter in which remaining $SO_2$ is absorbed and reacts with remaining $H_2O_2$ contained in the dilute sulphuric acid wetting the fibre material.

Secondly, the water comprised in the solution cools off the off-gas in line 2 by evaporation of the droplets, whereby the off-gas is cooled off to a desired temperature of the filter elements or candles typically to a temperature between 50° C. and 70° C. The concentration of $H_2SO_4$ in the produced acid will be the equilibrium concentration of $H_2SO_4$ at the actual temperature and $H_2O$ partial pressure in the gas phase.

Up to 98% $SO_2$-removal can be achieved at, typically, about 95% utilisation of the $H_2O_2$.

EXAMPLE

An off-gas stream of 1000 $Nm^3$/h at 100° C. contains 200 ppm $SO_2$+10% $H_2O$ and has a temperature of 100° C. 96% $SO_2$ removal is desired. The aerosol filter is designed for operation at maximum 70° C. Operation at 67-70° C. is chosen in order to achieve the highest possible acid strength and low content of remaining $H_2O_2$ in the produced acid.

The process is conducted as follows: 15.7 kg/h water containing 2.0 wt % $H_2O_2$ is injected into the off-gas, whereby the off-gas is cooled to 65-70° C. in thermal equilibrium. The mist filter is 75 mm thick and has a flow area of 2.5 $m^2$. The diameter of the fibres is about 8 μm. Experiments carried out under these conditions show that about 96% of the $SO_2$ is removed under production of 1.7 kg/h 50% $H_2SO_4$ with about 500 ppm $H_2O_2$. The treated gas contains less than 2 ppm $H_2SO_4$ and the content of $H_2O_2$ is below the detection limit.

The invention claimed is:

1. A process for removal of $SO_2$ in off-gases having a temperature of 50-120° C. and containing 0.001-0.1 vol % $SO_2$, comprising the steps of:
   oxidizing the $SO_2$ to $H_2SO_4$ without the use of an absorption tower by spraying an aqueous solution of $H_2O_2$ into the off-gas upstream of an aerosol filter to form $H_2SO_4$ by reaction in the gas phase between $SO_2$ and $H_2O_2$; and
   removing the produced sulphuric acid from the off-gas in the aerosol filter.

2. A process as in claim 1, in which the off-gas is cooled by evaporation of the water comprised in the solution being sprayed into the off-gas upstream of the filter.

3. A process as in claim 1, in which a wet electrostatic separator is used in place of an aerosol filter.

* * * * *